US009730111B2

(12) United States Patent
Köse et al.

(10) Patent No.: US 9,730,111 B2
(45) Date of Patent: Aug. 8, 2017

(54) METHODS AND SYSTEMS FOR MAXIMIZING THROUGHPUT FOR RATE-ADAPTIVE WIRELESS COMMUNICATION

(71) Applicant: TrellisWare Technologies, Inc., San Diego, CA (US)

(72) Inventors: Cenk Köse, San Diego, CA (US); Michael P. Fitz, Los Angeles, CA (US); Keith M. Chugg, La Cañada, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 140 days.

(21) Appl. No.: 14/925,788

(22) Filed: Oct. 28, 2015

(65) Prior Publication Data

US 2017/0127431 A1    May 4, 2017

(51) Int. Cl.
*H04W 28/22* (2009.01)
*H04W 72/08* (2009.01)
*H04L 12/26* (2006.01)

(52) U.S. Cl.
CPC ......... *H04W 28/22* (2013.01); *H04L 43/0888* (2013.01); *H04W 72/085* (2013.01); *H04W 72/087* (2013.01)

(58) Field of Classification Search
CPC ............. H04L 12/2673; H04L 12/2634; H04L 12/2676; H04L 25/03974; H04L 43/0888; H04L 45/125; H04L 45/123; H04L 43/08; H04W 28/18; H04W 72/087; H04W 72/085; H04W 28/22

See application file for complete search history.

(56) References Cited

U.S. PATENT DOCUMENTS

| 8,611,288 B1 | 12/2013 | Zhang et al. |
| 2011/0194419 A1 | 8/2011 | Lee et al. |
| 2012/0314594 A1* | 12/2012 | Mahadevappa ....... H04W 24/10 370/252 |

OTHER PUBLICATIONS

Lau et al., "Variable-Rate Adaptive Trellis Coded QAM for Flat-Fading Channels," IEEE Transactions on Communications, vol. 49, No. 9, Sep. 2001, 11 pages.

* cited by examiner

*Primary Examiner* — Ashley Shivers
(74) *Attorney, Agent, or Firm* — Kilpatrick Townsend & Stockton, LLP

(57) ABSTRACT

Throughput for rate-adaptive wireless communication is maximized by accounting for the rate loss associated with selecting a transmission rate as a function of the actual rate supported by the channel. An optimal rate is selected by minimizing a set of average cost functions; each of the average cost functions is based on the delayed LQMs and rate-loss cost functions associated with selecting a candidate transmission rate as a function of a maximum rate supported by the channel.

20 Claims, 6 Drawing Sheets

100

110 — Receiving a plurality of link quality metrics (LQMs), wherein the plurality of LQMs characterizes a channel at a plurality of times $t-nd$, where $n = 1, 2, 3, ...$, and $d$ is a feedback delay 120 — Computing a set of $M$ average cost functions, wherein an i-th average cost function is based on the plurality of link quality metrics and a set of $M$ rate-loss cost functions, wherein the j-th rate-loss cost function is associated with selecting an i-th rate and a j-th rate from an ordered set of $M$ rates, wherein the i-th rate is a candidate transmission rate, and wherein the j-th rate is a maximum rate supported by the wireless channel 130 — Selecting the optimal rate from the ordered set of $M$ rates, wherein the optimal rate corresponds to a minimum of the set of $M$ average cost functions

*FIG. 1*

METHODS AND SYSTEMS FOR MAXIMIZING THROUGHPUT FOR RATE-ADAPTIVE WIRELESS COMMUNICATION

FIELD OF THE INVENTION

The present invention relates to the field of radio communication systems, and more specifically, to the field of packet radio communication system protocols.

BACKGROUND

Communication systems that employ link adaptation seek to maximize link utilization by selecting an information rate that is best suited for the prevalent link quality. Typically, a link adaptation scheme consists of a set of modes each incorporating a different modulation and/or coding scheme (commonly referred to as Adaptive Coding and Modulation, or ACM) or some other link parameter controlling the data rate.

Link adaptation is accomplished by establishing a set of threshold values for choosing different transmission modes. These threshold values are used to determine the selection of each mode in the adaptation scheme based on some real-time performance metric. A link adaptation system operates by periodically taking a real-time performance metric for each link (e.g., a link quality metric (LQM) or channel quality indicator (CQI)), comparing this performance metric with the threshold values for the modes, and then selecting the appropriate mode and rate that will maximize throughput.

The computation of the performance metrics can be performed directly at the receiver, e.g. as a signal-to-noise ratio (SNR), or indirectly at the transmitter, e.g. as a function of ACK/NACK messages fed back from the receiver. Traditional link adaptation systems have used the SNR or RSSI (received signal strength indicator) to determine an optimal rate to use for future transmissions (see, for example, the disclosure in U.S. Pat. No. 8,611,288), whereas other systems have used the congestion state of the network to adapt the coding and modulation (see, for example, the disclosure in U.S. Patent Application No. 2011/0194419). Other link adaptation schemes involve estimating the channel state at pilot positions that are fed back to the transmitter via a noisy feedback link. Then, using a linear prediction filter, current channel states are predicted at the transmitter and appropriate transmission modes are selected for the current transmission (see, for example, "Variable-Rate Adaptive Trellis Coded QAM for Flat-Fading Channels," V. K. N. Lau and M. D. Macleod, IEEE Transactions on Communications, Vol. 49, No. 9, pp. 1550-1560, September 2001).

In these systems, and link adaptation systems in general, rate selection is subject to feedback delay. If the feedback delay is non-negligible with respect to the time-constant of the link quality, mismatches between the transmitted rate and the supported rate will result in unreliable transmissions. That is, a rate loss will result if the current performance metrics (that are based on the delayed performance metrics) are overestimated or underestimated. Typically, link adaptation systems based on prediction, i.e. predicting the channel state or channel parameters, are unable to account for the rate loss associated with the estimation error of the prediction process. Thus, there is a need for link adaptation systems that minimize this rate loss, thereby maximizing the throughput of the communication system.

SUMMARY

Thus, it is an object of the present invention to provide methods and systems for maximizing throughput for rate-adaptive wireless communications. For example, in one embodiment, a method for maximizing throughput over a wireless channel from a first node to a second node comprises receiving a plurality of link quality metrics, wherein the plurality of link quality metrics characterize a fidelity of the wireless channel at a plurality of times t−nd, where n=1, 2, 3, . . . , and d is a feedback delay between the first node and the second node. A set of M average cost functions are computed wherein an i-th average cost function is based on the plurality of link quality metrics and a set of M rate-loss cost functions. The j-th rate-loss cost function is associated with selecting an i-th rate and a j-th rate from an ordered set of M rates, wherein the i-th rate is a candidate transmission rate, and the j-th rate is a maximum rate supported by the wireless channel. An optimal rate is selected from the ordered set of M rates, wherein the optimal rate corresponds to a minimum of the set of M average cost functions.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

These and other features, aspects, and advantages of the present invention will become better understood with regard to the following description, claims, and accompanying drawings, where:

FIG. 1 is a flow chart for a method for maximizing throughput for rate-adaptive wireless communications, according to one embodiment of the present invention;

Figure 2:
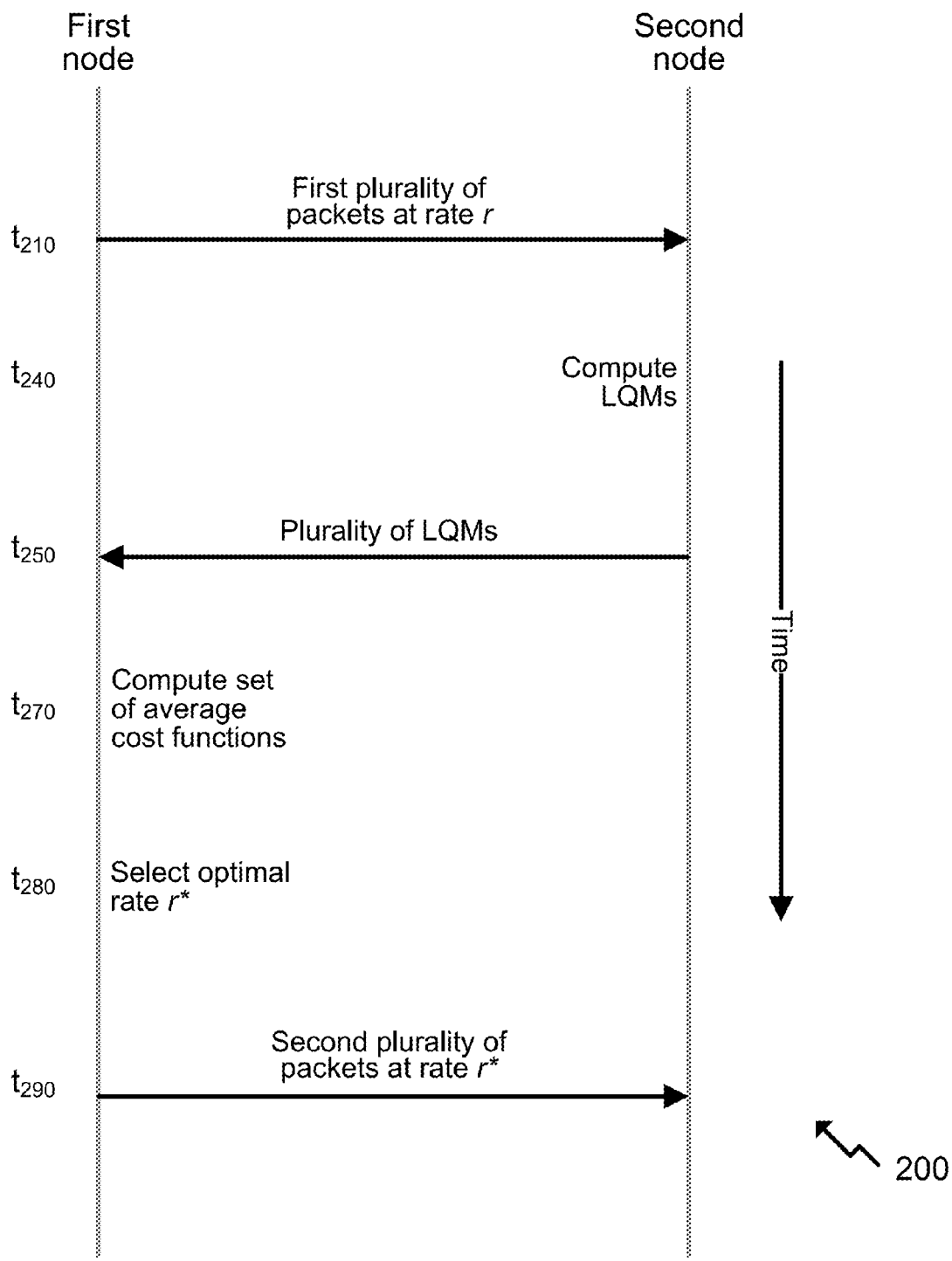
FIG. 2 shows a timeline for maximizing throughput for rate-adaptive wireless communications, according to an embodiment of the present invention.

Like labels are used to refer to the same or similar modules and/or events on a timeline in the drawings.

DETAILED DESCRIPTION

In the Summary above and in this Detailed Description, in the claims below, and in the accompanying drawings, reference is made to particular features (including method steps and events on a timeline) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Where reference is made herein to a timeline comprising two or more defined events, the defined events can be carried out in any order or simultaneously (except where the context excludes that possibility), and the timeline can include one or more other events which are carried out before any of the defined events, between two of the defined events, or after all the defined events (except where the context excludes that possibility).

As described above, a link adaptation system computes LQMs that are compared to a predefined set of thresholds associated with each available rate, wherein a transmission rate r with quality threshold q is assumed to be reliable as long as the LQM does not fall below q. In order to maximize the average throughput between a first node and a second node, the highest reliable transmission rate is selected as a function of the LQM. More formally, the present invention considers a rate-adaptive system with an ordered set of rates (with associated quality thresholds) that are denoted as $$\{(r_m, q_m): m=0,1,2,\ldots,M-1\}, \quad \text{Eq (1)}$$

wherein $r_m$ is the m-th rate with the associated quality threshold $q_m$. We further assume $0=r_0<r_1<r_M$ and $-\infty=q_0<q_1<\ldots<q_M$ for $m\geq 1$. Mode 0 indicates an outage condition, or no transmission, when the link quality falls below the threshold $q_1$. That is, the link adaptation system must continuously select an optimal rate, to adapt to the varying channel conditions, from the ordered set of M rates based on comparing the computed LQMs to the associated thresholds.

The link quality metric at a time t is denoted Q(t), and it is assumed that the most recent LQM available at time t is Q(t−d), where d>0 is the feedback delay of the system. In an embodiment, the feedback delay is the propagation delay between the first and second nodes. In another embodiment, it is the sum of the propagation delay between the two nodes and the processing delays of each of the nodes. The set $\{Q(\tau)\}$, $\tau=t-nd$ where $n=1, 2, 3, \ldots$, and d is the feedback delay of the system, of time-stamped LQMs is assumed to be a wide-sense stationary random process. The fastest reliable transmission rate at a time t is denoted as $$R(t)=\max\{r_m: q_m \leq Q(t)\}, \quad \text{Eq (2)}$$

which is the highest rate for which the associated quality threshold is less than or equal to the link quality metric at that time.

Conventional Link Adaptation

In order to alleviate the throughput loss due to the feedback delay, LQMs can be estimated in a predictive manner, i.e. by accounting for the feedback delay. That is, delayed LQMs are used to estimate or predict the current or future LQM, which is then used to determine the optimal rate to be used. Typically, an estimate $\hat{Q}(t)$ based on a history of LQMs $\{Q(t-kd): k=1, \ldots, K\}$ is formed such that the mean-squared LQM prediction error $$\mathbb{E}[(\hat{Q}_P(t+d)-Q(t))^2 | \{Q(t-kd): k=1, \ldots, K\}] \quad \text{Eq (3)}$$

is minimized. In this sense, for an LQM memory of K, the best LQM predictor is the conditional mean $$\hat{Q}_P(t)=\mathbb{E}[Q(t) | \{Q(t-kd): k=1, \ldots, K\}], \quad \text{Eq (4)}$$

with associated predictive rate selection $$R_P(t)=\max\{r_m: q_m \leq \hat{Q}_P(t)\}. \quad \text{Eq (5)}$$

The conditional mean may not be available in closed form in practice, in which case simpler sub-optimal predictors are considered. For example, in linear predictive link adaptation (LPLA), a linear filter is used to construct an LQM estimate of the form $$\hat{Q}_{LP}(t) = \sum_{k=1}^{K} f_k Q(t-kd), \quad \text{Eq (6)}$$

where the set of filter coefficients $\{f_k\}$ can be chosen to minimize Equation (3). The LPLA rate selection is then performed as $$R_{LPLA}(t)=\max\{r_m: q_m \leq \hat{Q}_{LP}(t)\}. \quad \text{Eq (7)}$$

The special case of $\{K=1, f_1=1\}$ is regarded as non-predictive link adaptation (NPLA), wherein the system simply relies on the most recent LQM for rate selection:

$$R_{NPLA}(t)=\max\{r_m: q_m \leq Q(t-d)\}. \quad \text{Eq (8)}$$

While predictive link adaptation is expected to outperform non-predictive link adaptation in terms of average throughput, minimizing the LQM estimation error variance does not directly translate to maximizing the average throughput since the objective function in Equation (3) does not take into account the different throughput loss implications as a function of the direction (or sign) of the estimation error. That is, when the LQM is underestimated, i.e. ($\hat{Q}_P(t)<Q(t)$), the rate loss is proportional to the rate difference ($R(t)-R_P(t)$), whereas overestimation of the LQM, i.e. ($\hat{Q}_P(t)>Q(t)$), results in a rate loss of approximately R(t).

Incorporating an asymmetric penalty, as described above, in the mean-squared error setting results in a non-differentiable cost function, making it difficult to find an optimal predictor. Embodiments of the present invention are able to account for such asymmetric costs by employing a Bayesian setting in link adaptation.

Bayesian Link Adaptation (BLA)

The Bayesian setting accounts for the rate loss associated with selecting a specific transmission rate by enabling the specification of non-negative cost functions. That is, a non-negative cost function $c(\hat{m}, m)$, associated with selecting rate $r_{\hat{m}}$ for transmission when the highest supported reliable rate is $r_m$, can be specified. As in conventional link adaptation, $r_{\hat{m}}$ is a function of the LQM vector observable, $Q_{1:K}[Q(t-d), \ldots, Q(t-Kd)]^T$, whereas the fastest supported rate $r_m$ is a function of only $Q_0=Q(t)$.

Using the "rate-loss" cost function $$c^*(\hat{m}, m) = \begin{cases} r_m, & \hat{m} > m \\ 0, & \hat{m} = m \\ r_m - r_{\hat{m}}, & \hat{m} < m \end{cases} \quad \text{Eq (9)}$$

the proposed Bayesian link adaptation (BLA) minimizes the average cost associated with the decision $\hat{m}$, which is defined as $$C(\hat{m}) = \sum_m c^*(\hat{m}, m) \mathbb{P}(Q_{1:K} \in \Gamma_{\hat{m}} | q_m \leq Q_0 < q_{m+1}), \quad \text{Eq (10)}$$

where $\Gamma_{\hat{m}} \subset \mathbb{R}^K$ is the set of K-dimensional observables $Q_{1:K}$ for which the system selects rate $r_{\hat{m}}$. That is, each of the M average cost functions is computed as a function of the plurality of LQMs (or observables) and the set of M rate-loss cost functions. The rate-loss cost functions are associated with selecting the transmission rate $r_{\hat{m}}$ when the maximum rate of the channel is assumed to be $r_m$ for each rate in the ordered set of M rates. In general, solving for decision regions $\Gamma_{\hat{m}}$ to minimize Equation (10) requires knowledge of the joint probability distribution of the K+1 LQMs, $Q_{0:K} = [Q_0, Q_1, \ldots, Q_K]^T$, and will rely on numerical optimization techniques.

The BLA is different from conventional link adaptation in that there is no explicit estimation of the LQM. In contrast, BLA maps a history of LQM observables ($Q_{1:K}$) to an available rate such that the average rate-loss is minimized.

FIG. 1 is a flow chart for a method (100) for maximizing throughput in a rate-adaptive system, comprising a first and second node, using the Bayesian link adaptation (BLA) scheme as described above, according to one embodiment of the present invention. The first and second nodes are able to transmit at a rate selected from an ordered set of M rates. Each of the M rates corresponds to a predefined set of waveform parameters. In an example, the predefined set of waveform parameters may comprise one or more of a block or packet size, a modulation type, and a code rate of a forward error-correcting code.

The method begins at step 110, wherein a plurality of LQMs that characterize the wireless channel between the two nodes at a plurality of times (t−nd, n=1,2,3, . . . , where d is the feedback delay of the system) is received at the first node. In an embodiment, the plurality of LQMs can be received from the second node. In another embodiment, the plurality of LQMs can be received from an LQM computation unit in the first node.

In an embodiment, the LQMs may be computed from pilot symbols in previously transmitted packets. The LQM may be a signal-to-noise ratio (SNR), signal-to-interference and noise ratio (SINR), received signal strength indicator (RSSI), a function of the instantaneous channel fading, or any other such channel quality metric, or any combination of these metrics. In another embodiment, the plurality of LQMs may be derived from the soft metrics at the output of a forward error-correcting code decoder and/or the output of an equalization processor.

At step 120, a set of M average cost functions are computed, wherein an i-th average cost function is based on the plurality of LQMs and a set of M rate-loss functions. Each of the M rate-loss functions are associated with selecting the i-th rate and a j-th rate from an ordered set of M rates, where j=0,1, . . . , M−1. The i-th rate is a candidate transmission rate $r_{\hat{m}}$ and the j-th rate is assumed to be a maximum rate supported by the wireless channel. In an example, M=4 (indexed {0,1,2,3}), and in reference to Equations (9) and (10), the average cost function for i=2, $C(\hat{m}=2)$, is based on the plurality of LQMs $Q_{1:K}$ and the following rate-loss cost functions: $c^*(\hat{m}=2,m=0)$, $c^*(2,1)$, $c^*(2,2)$ and $c^*(2,3)$.

In an embodiment, a subset of the M average cost functions may be computed to reduce the computational complexity of the rate-adaptation. For example, consider a system wherein a large number of potential rates are available, e.g. 0-20. If a previous transmission has used rate 17, and the channel is slowly varying, then the probability of requiring to switch to a mode in the mode range 0-5 is extremely low, and thus the computation of $C(\hat{m}=0)$ through $C(\hat{m}=5)$ can be avoided. This complexity reduction technique, if employed judiciously, will result in the same minimum average cost function being chosen over the complete set of M average cost functions and the truncated set of average cost functions. The elimination of specific average cost function computations can depend a previously employed rate, a previous LQM, other channel statistics, or any combination of these parameters.

At step 130, an optimal rate is selected based on the set of M average cost functions that were computed in the previous step. In particular, the optimal rate is the rate that corresponds to the index of the minimum of the set of M average cost functions.

Numerical Example Comparing NPLA, LPLA and BLA

As described above, BLA can maximize throughput in rate-adaptive wireless systems in comparison to NPLA and LPLA. Preferred embodiments of the present invention provide significant advantages in systems where the feedback delay is non-negligible. In an example, an FSO communication system with log-normal irradiance statistics is considered. It is assumed that the logarithm of the received SNR is a normal distribution with mean zero and variance $\sigma^2=0.2$, and thus, the link quality metric is defined as $$Q(t) = \log(SNR(t)) \sim \mathcal{N}(0, \sigma^2). \quad \text{Eq (11)}$$

In this example, two waveforms modes are considered: (i) rate $r_1=1$ Mbps with LQM threshold $T_1=\log(SNR_1)=0.0$, and (ii) rate $r_2=3$ Mbps with threshold $T_2=\log(SNR_2)=0.7$, in addition to the default mode 0 that signifies an outage condition, or no transmission. It is assumed that a single outdated LQM, $Q(t-d)=0.62$ is available, and that the variance $\sigma^2$ of $Q(t)$ as well as the correlation $\mathbb{E}(Q(t)Q(t-d)) = \rho\sigma^2$ are known to the receiver.

The NPLA scheme will select rate $r_1=1$ Mbps on the basis of $Q(t-d)=0.62$, which is greater than $T_1$ but less than $T_2$. Based on $Q(t-d)$, the best linear prediction of the LQM at time t is $\hat{Q}(t)=\rho Q(t-d)=0.56$, and thus the LPLA will similarly select rate $r_1=1$ Mbps. Since both the observed and predicted values of the LQM are between the thresholds $T_1$ and $T_2$, the NPLA and LPLA schemes will select rate $r_1$.

The BLA scheme constructs a 3×3 matrix, comprising the corresponding non-negative rate-loss cost functions as defined in Equation (9), which is given by $$\begin{bmatrix} 0 & r_1 & r_2 \\ 0 & 0 & r_2 - r_1 \\ 0 & r_1 & 0 \end{bmatrix},$$

and computes the average cost of selecting a candidate transmission mode $\hat{m}$ as $C(0)=1.72$, $C(1)=0.72$ and $C(2)=0.64$. The BLA scheme selects the mode that corresponds to the minimum average cost function, and thus, rate $r_2=3$ Mbps is selected.

In comparison to the NPLA and LPLA schemes, the BLA scheme selects a more aggressive mode of transmission, at a rate of 3 Mbps instead of 1 Mbps. If the channel were to support only 1 Mbps, then transmitting at $r_2$ would result in a loss of 1 Mbps. However, if the channel were able to support 3 Mbps, then transmitting at $r_1$ would result in a potential loss of 2 Mbps. Thus, the BLA selects a rate to minimize the average rate loss, thereby maximizing the throughput over the wireless channel.

Embodiments of the Present Invention

Figure 3:
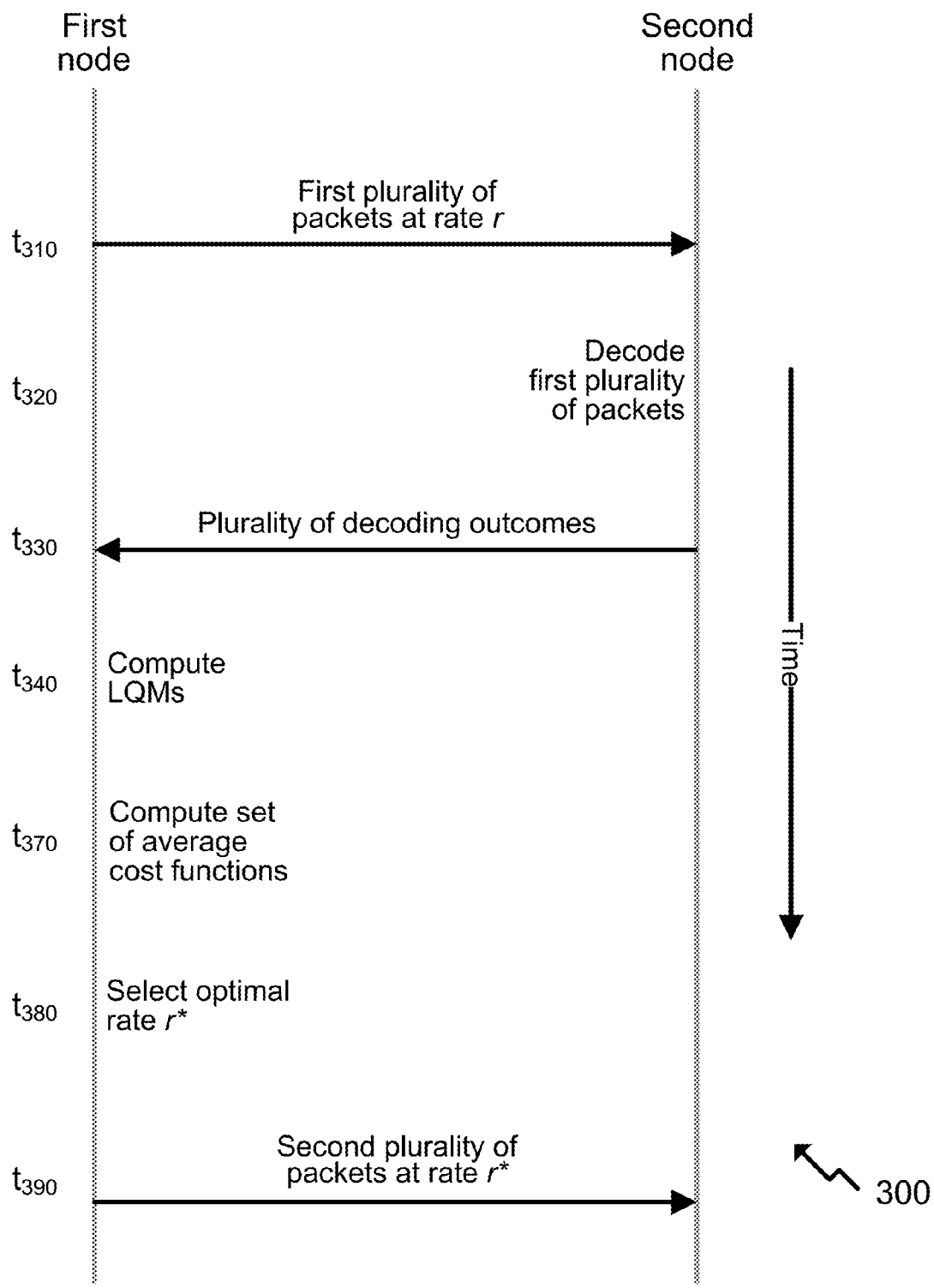
FIG. 3 shows a timeline for maximizing throughput for rate-adaptive wireless communications, according to another embodiment of the present invention.
Figure 4:
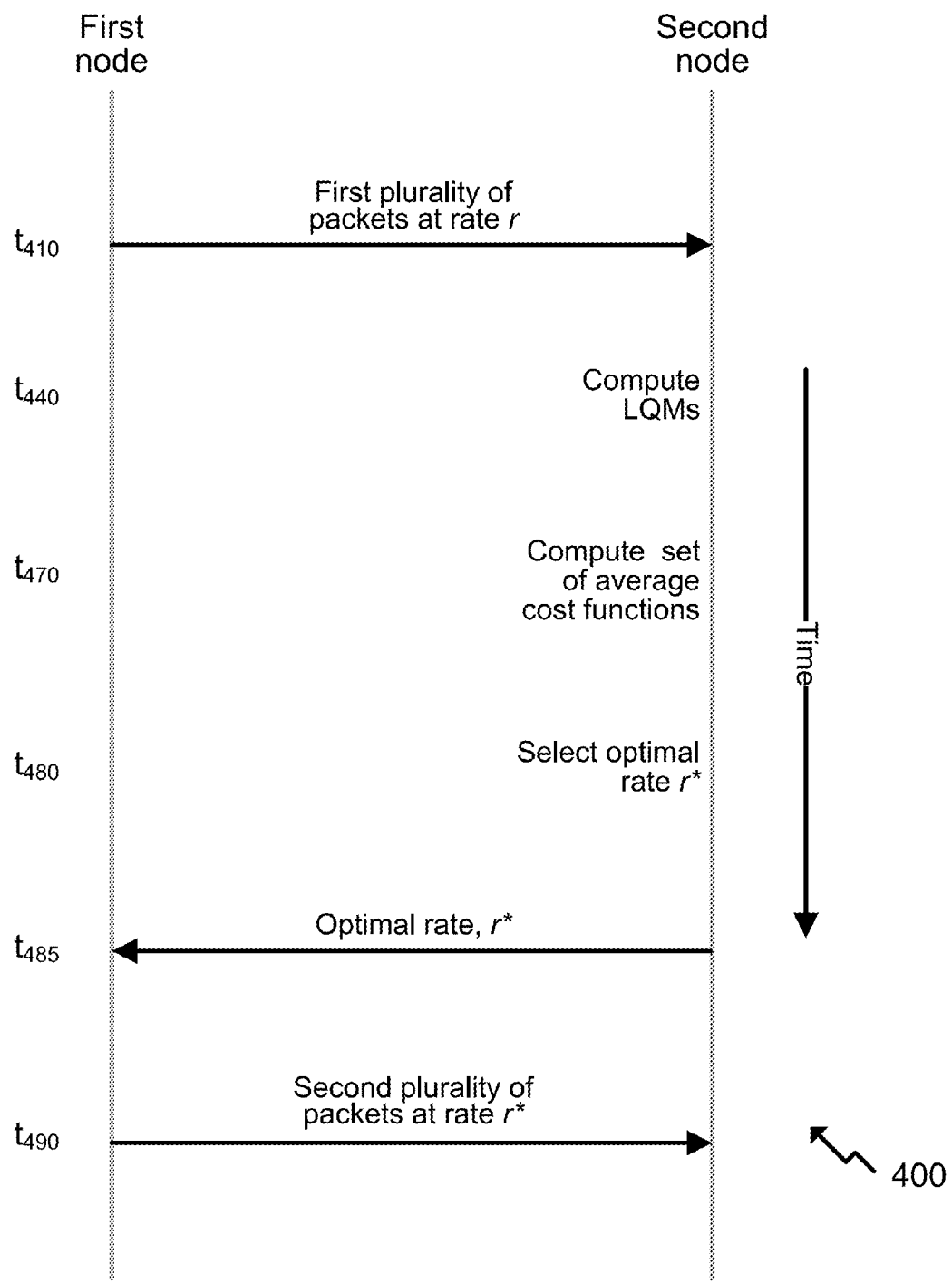
FIG. 4 shows a timeline for maximizing throughput for rate-adaptive wireless communications, according to yet another embodiment of the present invention.

The method flowchart shown in FIG. 1 can be incorporated into various embodiments that maximize throughput for rate-adaptive wireless communication. FIGS. 2-4 describe at least some features of certain embodiments that enable throughput maximization between a first node and a second node over a wireless channel.

FIG. 2 shows a timeline for maximizing throughput for rate-adaptive wireless communications, according to an embodiment of the present invention. At time $t_{210}$, the first node transmits a plurality of packets to the second node at a rate r. The rate of transmission of this first plurality of packets may, or may not, be at an optimal rate for the prevalent channel conditions. The first plurality of packets is received at the second node, which computes LQMs based on this set of packets at time $t_{240}$.

As described earlier the LQMs may be computed based on an average SNR, SINR or RSSI of the set of packets, or on soft metrics at the output of an equalization processor or a forward error-correcting code decoder during the processing and demodulation of this set of packets. In another embodiment, the LQMs can be determined using the training data embedded in the first plurality of packets.

At time $t_{250}$, the second node transmits the plurality of computed LQMs to the first node. The rate of transmission of the LQMs may, or may not, be at a previously optimal rate with regards to the link from the second node to the first node. The received LQMs are used at time $t_{270}$ to compute a set of M average cost functions, wherein each of the average cost functions is based on the received plurality of LQMs and a set of M rate-loss cost functions. As described earlier, each of the non-negative rate-loss cost functions is associated with selecting a rate for transmission as a function of the maximum rate supported by the channel.

At time $t_{280}$, an optimal rate is selected by finding the minimum of the M computed average cost functions, and a second plurality of packets is transmitted from the first node to the second node at this optimal transmission rate at time $t_{290}$.

FIG. 3 shows a timeline for maximizing throughput for rate-adaptive wireless communications, according to an embodiment of the present invention. This embodiment includes some timeline events and/or steps that are similar to those shown in FIG. 2 and described above. At least some of these timeline events and/or steps may not be separately described in this section.

At time $t_{310}$, the first node transmits a plurality of packets to the second node at a rate r. The second node receives and decodes the plurality of packets at time $t_{320}$, resulting in a set of decoding outcomes, i.e. decoding success or decoding failures. The second node transmits these decoding outcomes to the first node at time $t_{330}$. The decoding outcomes are used to compute LQMs at the first node at time $t_{340}$. In another embodiment of the present invention that may be employed in an automatic repeat request (ARQ) system, and a plurality of ACK and NACK messages may be used to compute LQMs.

FIG. 4 shows a timeline for maximizing throughput for rate-adaptive wireless communications, according to an embodiment of the present invention. This embodiment includes some timeline events and/or steps that are similar to those shown in FIGS. 2 and 3 and described above. At least some of these timeline events and/or steps may not be separately described in this section.

As shown in FIG. 4, the second node receives a first plurality of packets from the first node at time $t_{410}$. Based on this set of packets, the second nodes computes LQMs, computes the set of average cost functions, and selects the optimal rate by minimizing over the set of average cost functions at times $t_{440}$, $t_{470}$ and $t_{480}$, respectively. The optimal rate is transmitted to the first node at time $t_{485}$, which subsequently enables the first node to transmit a second plurality of packets to the second node at the optimal rate at time $t_{490}$.

BLA for Free-Space Optical (FSO) Communication Systems

Figure 5:
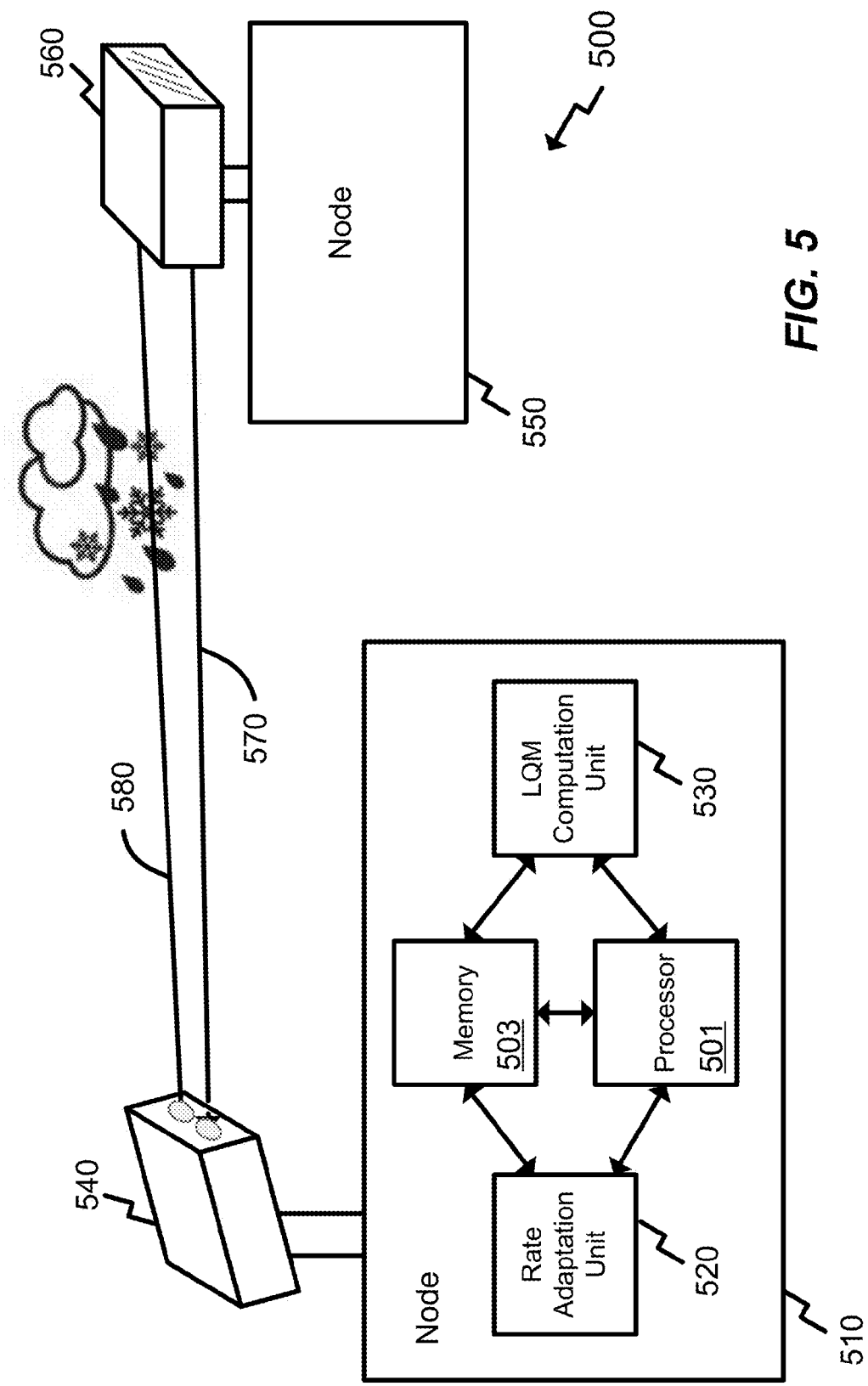
FIG. 5 is a block diagram of a system for maximizing throughput for rate-adaptive wireless communications, and comprising the rate adaptation unit according to an embodiment of the present invention.

FIG. 5 is a block diagram of a free-space optical (FSO) communications system (500) comprising the rate adaptation unit according to an embodiment of the present invention. In FSO systems, atmospheric turbulence may cause signal fading with coherence times less than a millisecond. For a link distance of 50 km, adaptation has to rely on LQMs that are delayed by at least 150 microseconds, during which the link quality may change significantly. Preferred embodiments of the present invention are particularly beneficial in scenarios that exhibit a non-negligible feedback delay, such as FSO communication systems.

As shown in FIG. 5, a first node (510) comprises a processor (501), a memory (503), an LQM computation unit (530), a rate adaptation unit (520) and an antenna (540). As discussed in the context of the various embodiments of the present invention, the first node is able to bi-directionally communicate with a second node (550) through its antenna (560), via forward (580) and reverse (570) optical paths. As is common in many FSO systems, the optical transmission paths are subject to environmental and channel conditions that result in non-negligible outage periods, which can further result in the forward and reverse paths not being equivalent. The rate adaptation unit (520) and the LQM computation unit (530) may be external to the processor (501) as shown in the first node, or may be integrated into the processor in another embodiment. Although not shown in FIG. 5, the second node (550) may also include a processor, a memory, a rate adaptation unit, and an LQM computation unit.

In an FSO system, with a propagation delay of $d_0$, the received signal intensity Z(t) at a time t is modeled as $$Z(t)=H(t)S(t-d_0)+N(t), \qquad \text{Eq (12)}$$

where $S(t) \geq 0$ is the transmitted signal intensity, $H(t) \geq 0$ is the channel gain, and N(t) is the background noise. We define the logarithm of the channel fading as the LQM, $$Q_{FSO}(t)=\log H(t), \qquad \text{Eq (13)}$$

which is assumed to be a Gaussian process, thereby implying that H(t) has a log-normal distribution. For this scenario, and since the LQM is a Gaussian process, there exists a closed-form solution for the optimal mode/rate selection that depends on the conditional mean and conditional variance of the LQM at time t. It is noted that the conditional mean needs to be recomputed for each new LQM that becomes available.

The advantages of the BLA are quantified in the context of an FSO system that uses on-off-keyed (OOK) signaling at a 1 GHz keying rate (or with channel bit duration, T=1 nsec). The transmitter sends information using packets consisting of 256 training bits followed by a coded payload (using a low-density parity-check (LDPC) forward error-correcting code) using one of five standard code rates: 1/2, 2/3, 4/5, 8/9 and 16/17. The available information rates (not accounting for the training sequence) are $$r_m = \frac{2^{m-1}}{1+2^{m-1}} Gbps, m = 1, 2, 3, 4, 5. \quad \text{Eq (10)}$$

The logarithm of the channel fading process is generated using a first-order autoregressive model $$H(t)=\exp(A(t)),$$

$$A(t)=\rho A(t-T)+\sqrt{1-\rho^2}W(t), \quad \text{Eq (10)}$$

where W(t) is a zero-mean white Gaussian noise process with unit variance. The parameter ρ is adjusted such that the 99 percent bandwidth of the process A(t) is 1 kHz. The background noise, N(t), also assumed to be a zero-mean white Gaussian process, is scaled such that $\mathbb{E}[S(t)^2/N(t)^2]=10$ dB.

For each of the three link adaptation schemes (NPLA, LPLA and BLA) considered herein, the average throughput achieved over 60 seconds of simulated communications without retransmissions is recorded. For all three schemes, the receiver computes the LQM using the training sequence and performs rate selection. For LPLA and BLA, an LQM memory of K=4 is assumed, and the first and second order statistics are computed using 64 of the latest detected packets in a sliding window fashion. As a function of the link distance L, the selected rate is made available to the transmitter after $d=d_0=L/c$ seconds, where c is the speed of light. All processing delays are assumed to be negligible compared to $d_0$ and are therefore ignored.

Figure 6:
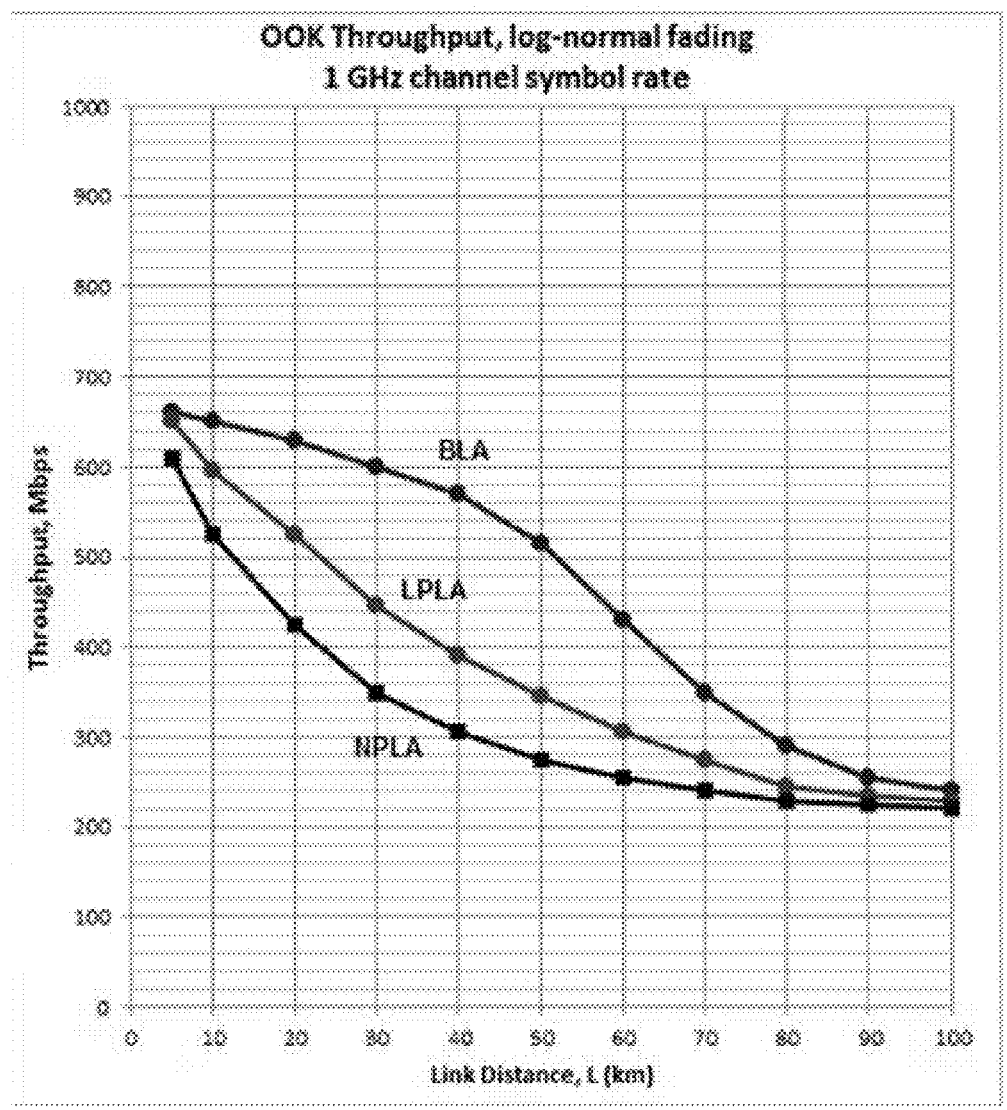
FIG. 6 shows simulation results comparing the performance of an embodiment of the present invention to prior art systems.

FIG. 6 displays the average throughput as a function of link distance for each of the three link adaptation schemes considered above. The BLA scheme is observed to outperform the conventional link adaptation methods (NLPA and LPLA) for link distances up to 100 km, by delivering as much as 50 percent more throughput than the LPLA method at L=50 km.

The processor 501 shown in FIG. 5 may comprise component digital processors and may be configured to execute computer-executable program instructions stored in memory 503. For example, the component digital processors may execute one or more computer programs for enabling throughput maximization in rate-adaptive wireless communication in accordance with embodiments of the present invention.

Processor 501 may comprise a variety of implementations for the computation of link quality metrics, average cost functions and rate-loss cost functions, and minimization and selection operations, as well as a microprocessor, a digital signal processor (DSP), an application-specific integrated circuit (ASIC), one or more field programmable gate arrays (FPGAs), state machines, or the like. Processor 501 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 503 may comprise a non-transitory computer-readable medium that stores instructions which, when executed by the processor 501, cause the processor 501 to perform various steps, such as those described herein. Examples of computer-readable media include, but are not limited to, electronic, optical, magnetic, or other storage or transmission devices capable of providing the processor 501 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 501 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed is:

1. A method for maximizing throughput over a wireless channel from a first node to a second node, the method comprising:
    receiving, at the first node, a plurality of link quality metrics, wherein the plurality of link quality metrics characterize a fidelity of the wireless channel at a plurality of times t−nd, where n=1, 2, 3, . . . , and d is a feedback delay between the first node and the second node;
    computing, at the first node, a set of M average cost functions, wherein an i-th average cost function is based on the plurality of link quality metrics and a set of M rate-loss cost functions, wherein the j-th rate-loss cost function is associated with selecting an i-th rate and a j-th rate from an ordered set of M rates, wherein the i-th rate is a candidate transmission rate, and wherein the j-th rate is a maximum rate supported by the wireless channel; and
    selecting, at the first node, an optimal rate from the ordered set of M rates, wherein the optimal rate corresponds to a minimum of the set of M average cost functions.

2. The method of claim 1, further comprising:
    transmitting, from the first node, a plurality of packets at the optimal rate at a time t.

3. The method of claim 1, further comprising:
    transmitting, from the first node, the optimal rate;
    receiving, at the second node, the optimal rate; and
    transmitting, from the second node, a plurality of packets at the optimal rate.

4. The method as in claim 3, further comprising:
    receiving the plurality of link quality metrics from a link quality metric computation unit in the first node.

5. The method of claim 1, further comprising:
computing, at the second node, the plurality of link quality metrics; and
transmitting, from the second node, the plurality of link quality metrics.

6. The method of claim 5, wherein the plurality of link quality metrics are computed based on log-likelihood ratios from an output of a forward error-correcting code decoder.

7. The method of claim 5, further comprising:
transmitting, from the first node, a plurality of packets.

8. The method of claim 7, wherein the plurality of packets comprise pilot symbols, and wherein the plurality of link quality metrics are computed based on the pilot symbols.

9. The method of claim 7, further comprising:
receiving, at the second node, the plurality of packets; and
decoding, at the second node, the plurality of packets to derive a plurality of decoding outcomes, wherein the plurality of link quality metrics are computed based on the plurality of decoding outcomes, and wherein each of the plurality of decoding outcomes is either a decoding success or a decoding failure.

10. The method of claim 1, wherein the wireless channel is a free-space optical channel.

11. The method of claim 10, wherein each of the plurality of link quality metrics is based on a logarithm of a magnitude of the wireless channel at each of the plurality of times.

12. The method of claim 1, wherein each of the ordered set of M rates corresponds to a predefined set of waveform parameters, and wherein the predefined set of waveform parameters comprises a modulation and a code rate of a forward error-correcting code.

13. A system for maximizing throughput over a wireless channel, the system comprising:
a first node; and
a second node,
wherein the first node is configured to:
receive a plurality of link quality metrics, wherein the plurality of link quality metrics characterize a fidelity of the wireless channel at a plurality of times $t-nd$, where $n=1, 2, 3, \ldots$, and d is a feedback delay between the first node and the second node;
compute a set of M average cost functions, wherein an i-th average cost function is based on the plurality of link quality metrics and a set of M rate-loss cost functions, wherein the j-th rate-loss cost function is associated with selecting an i-th rate and a j-th rate from an ordered set of M rates, wherein the i-th rate is a candidate transmission rate, and wherein the j-th rate is a maximum rate supported by the wireless channel; and
select an optimal rate from the ordered set of M rates, wherein the optimal rate corresponds to a minimum of the set of M average cost functions.

14. The system of claim 13, wherein the first node is further configured to transmit a plurality of packets at the optimal rate at a time t.

15. The system of claim 13, wherein the first node is further configured to transmit the optimal rate, and wherein the second node is further configured to receive the optimal rate and transmit a plurality of packets at the optimal rate.

16. The system as in claim 13, wherein the plurality of link quality metrics are received from a link quality metric computation unit in the first node.

17. The system of claim 13, wherein the second node is further configured to:
compute the plurality of link quality metrics; and
transmit the plurality of link quality metrics.

18. The system of claim 13, wherein the wireless channel is a free-space optical channel.

19. The system of claim 18, wherein each of the plurality of link quality metrics are based on a logarithm of a magnitude of the wireless channel at each of the plurality of times.

20. A non-transitory tangible computer-readable medium embodying program code executable by a computing system, the program code enabling throughput maximization over a wireless channel from a first node to a second node, the program code comprising:
program code for receiving a plurality of link quality metrics, wherein the plurality of link quality metrics characterize a fidelity of the wireless channel at a plurality of times $t-nd$, where $n=1, 2, 3, \ldots$, and d is a feedback delay between the first node and the second node;
program code for computing a set of M average cost functions, wherein an i-th average cost function is based on the plurality of link quality metrics and a set of M rate-loss cost functions, wherein the j-th rate-loss cost function is associated with selecting an i-th rate and a j-th rate from an ordered set of M rates, wherein the i-th rate is a candidate transmission rate, and wherein the j-th rate is a maximum rate supported by the wireless channel; and
program code for selecting an optimal rate from the ordered set of M rates, wherein the optimal rate corresponds to a minimum of the set of M average cost functions.

* * * * *